United States Patent
Bates et al.

(10) Patent No.: US 7,299,456 B2
(45) Date of Patent: Nov. 20, 2007

(54) RUN INTO FUNCTION

(75) Inventors: Cary L. Bates, Rochester, MN (US);
Vadim Berestetsky, North York (CA);
Paul Buenger, Eau Claire, WI (US);
Steven G. Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 10/666,033

(22) Filed: Sep. 18, 2003

(65) Prior Publication Data
US 2005/0066313 A1  Mar. 24, 2005

(51) Int. Cl.
*G06F 9/44* (2006.01)
(52) U.S. Cl. .............. 717/129; 717/124; 717/127
(58) Field of Classification Search ......... 717/124, 717/127, 129; 714/47
See application file for complete search history.

(56) References Cited

U.S. PATENT DOCUMENTS

| | | | | |
|---|---|---|---|---|
| 5,050,168 A | * | 9/1991 | Paterson | 714/35 |
| 5,093,914 A | * | 3/1992 | Coplien et al. | 717/129 |
| 5,560,009 A | * | 9/1996 | Lenkov et al. | 717/124 |
| 5,845,125 A | * | 12/1998 | Nishimura et al. | 717/129 |
| 6,077,312 A | | 6/2000 | Bates et al. | |
| 6,158,045 A | * | 12/2000 | You | 717/124 |
| 6,240,545 B1 | * | 5/2001 | Carmichael et al. | 717/128 |
| 7,047,521 B2 | * | 5/2006 | Bunnell | 717/130 |
| 2003/0106046 A1 | * | 6/2003 | Arnold et al. | 717/129 |

OTHER PUBLICATIONS

U.S. Appl. No. 10/113,317, "Extended "Run To" Function", Cary L. Bates et al., filed May 29, 2002.

* cited by examiner

*Primary Examiner*—Meng-Al T. An
*Assistant Examiner*—Jason Mitchell
(74) *Attorney, Agent, or Firm*—Patterson & Sheridan, LLP

(57) ABSTRACT

Method, apparatus and article of manufactured for debugging code. A user selects a function call (e.g., a method of object-oriented code) and a debugger parses the function call and sets breakpoints on the entry points of all instances of the method (assuming more than one). During execution, when one of the breakpoints is hit, the debugger determines whether the corresponding method is being called from the user-specified location in the code.

21 Claims, 9 Drawing Sheets

BREAKPOINT TABLE — 150

| STATEMENT | OP CODE | ADDRESS | RUN INTO # | STACK POSITION |
|---|---|---|---|---|
| STMT 1 | STORE | 23453 | 11 | FUNC 6 |
| STMT 8 | LOAD | 23581 | 2 | FUNC 11 |
| STMT 3 | LOAD CONSTANT | 27578 | 4 | FUNC 3 |
| STMT 12 | STORE | 21345 | 11 | FUNC 6 |
| STMT 4 | LOAD | 25628 | 8 | FUNC 8 |
| 402 | 404 | 406 | 408 | 410 |

FIG. 4

RUN INTO FUNCTION

BACKGROUND OF THE INVENTION

1. Field of the Invention

The present invention generally relates to data processing and more particularly to debugging code.

2. Description of the Related Art

A programmer develops a software program by producing and entering source code into files using a text editor program. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Simply stated, debugging is performed by a computer programmer to locate and identify errors in a program under development. Typically, a programmer uses another computer program commonly known as a "debugger" to debug a program under development. An effective debugger program is necessary for rapid and efficient development of software and typically provides functions including run-to-cursor, step into, step over, step outof, breakpoints and the like.

One primary operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

A second operation supported by conventional debuggers is a breakpoint operation, which permits a computer programmer to identify with a "breakpoint" a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis. Most breakpoints supported by conventional debuggers are unconditional, meaning that once such a breakpoint is reached, execution of the program is always halted. Some debuggers also support the use of conditional breakpoints, which only halt execution of a program when a variable used by the program is set to a predetermined value at the time such a breakpoint is reached.

Another conventional debugging operation, the run-to-cursor function, allows a user to place a cursor on a selected statement and then execute the program from a current stopped position to the cursor. When execution reaches the line at which the cursor is located, the debugger gains control. In this way, the user may observe the effects of running the portion of code from the current stopped position to the cursor position. If unexpected results are identified, the user has successfully located the source of a problem and may then take remedial steps to correct the problem.

Typically, step operations, breakpoints, and run-to functions are used together to simplify the debugging process. For example, a common debugging operation is to set a breakpoint at the beginning of a desired set of instructions to be analyzed, and then begin executing the program. Once the breakpoint is reached, the program is halted, and the programmer then steps through the desired set of instructions line-by-line using the step operation, or runs to a selected line number. Consequently, a programmer is able to quickly isolate and analyze a particular set of instructions without having to step through irrelevant portions of a computer program.

While the foregoing conventional debugging tools are helpful, they are also substantially limited in certain situations. In particular, object-oriented programming and other highly modular languages present some unique debugging problems not easily handled by conventional techniques.

With an object-oriented programming language, for example, a program is constructed from a number of "objects", each of which includes data and/or one or more sets of instructions (often referred to as "routines" or "methods") that define specific operations that can be performed on the data. A large number of objects may be used to build a computer program, with each object interacting with other objects in the computer program to perform desired operations.

One characteristic of an object-oriented programming language that can make debugging problematic is that object classes can have many subclasses. As a result, it can be tedious to set breakpoints where you need them. Consider the code shown in TABLE I.

TABLE I

| 25 | while(i < 40){ |
|----|----------------|
| 26 | . |
| 27 | . |
| 28 | widget = this.getWidget(tool.foo1( ). widget.foo2( )).: |
| 29 | widget.run( ): |
| 30 | |
| 31 | } |

Assume that the programmer has stopped somewhere in the code prior to line 28 and wants to "step into" the method "widget.foo2()" called at this point, i.e., from the "main" function. Using conventional debugging techniques the programmer must first get to line 28 and then use the "step into" function. The problem with this approach is that it will cause the programmer to step into "tool.foo1()" before getting to the desired method. As an alternative, the user may set the cursor on the statement containing the method "widget.foo2()" and then employ the "run-to-cursor" function to arrive at the statement. Upon arriving at the statement, the user must employ the "step into" function. Accordingly, this approach is labor intensive in that it requires the user to perform multiple steps. As yet another alternative, the programmer must manually identify the portion of the source code containing the method, identify the method within the code, set a breakpoint on each entry point to that method, and then after encountering the desired breakpoint manually remove all the remaining breakpoints. Such an approach is burdensome and error prone.

Another problem that is especially pronounced in highly modular languages (such as object-oriented programming) results from the fact that some instructions in a computer program are executed fairly often for different purposes, and may result in many needless stoppages before a desired stoppage is encountered. More specifically, since some methods are called by many different objects, placing a conventional breakpoint on a method may result in hundreds of unwanted stoppages prior to occurrence of a desired stoppage. This may be illustrated with the following code: foo(obj1.bar(),obj2.bar()); where obj1 and obj2 are both objects of the same class. Assume the programmer desires to run into obj2.bar(). If the programmer simply examines the class hierarchy and places a breakpoint on each instance of obj2.bar(), the program will be halted even when obj1.bar() is encountered.

Therefore, there is a need for improvements in debugging computer programs to simplify and facilitating the debugging process, particularly in object-oriented environments.

SUMMARY OF THE INVENTION

The present invention generally relates to methods, apparatus and articles of manufacture for implementing a run into function for a selected code portion.

One embodiment provides for a computer-implemented method for debugging code comprising, while execution is halted at a first point in the code, receiving a selection of a target call site located at a second point in the code and comprising a call to a routine; and setting at least one run into breakpoint configured to halt subsequent execution only when an execution path arrives at the routine from the target call site. In one embodiment, setting the at least one run into breakpoint comprises setting the run into breakpoint on an instruction calling the routine. In this case, the function is stepped into upon encountering the breakpoint. In another embodiment, setting the at least one run into breakpoint comprises setting the run into breakpoint at each entry point to the routine. In this case, execution may be halted and a user interface returned upon encountering the breakpoint, only if it can be determined that the routine is entered from the selected target call site.

Another embodiment provides for a computer-implemented method for debugging code comprising receiving a selection of a target call site in the code, the target call site comprising a call to a routine; establishing a breakpoint at an entry point to the selected target call site; programmatically determining call context information identifying a location of the selected target call site in the code; upon encountering the breakpoint during execution of the code, determining whether the routine is called from the selected target call site based on the stored call context information; and if so, halting execution of the code.

Another embodiment of a computer-implemented method for debugging code comprises receiving a selection of a target call site in the code, the target call site comprising a routine having a plurality of entry points; establishing a breakpoint at each of the plurality of entry points; and programmatically determining call context information uniquely identifying the selected target call site. For each of the breakpoints encountered during execution of the code, the method further comprises determining whether the routine is called from the selected target call site based on the call context information; and if so, halting execution of the code.

Yet another embodiment of a computer-implemented method for debugging object-oriented code comprises receiving a selection of a target call site in the code, the target call site comprising a method; identifying a plurality of entry points for the method; establishing a breakpoint at each of the plurality of entry points; determining call context information uniquely identifying the selected target call site.

For each of the breakpoints encountered during execution of the code, the method further comprises determining whether the routine is called from the selected target call site based on the call context information; and if so, halting execution of the code.

Yet another embodiment provides a computer comprising a memory; code under debug resident in the memory, the code comprising as least one target call site selected by a user and comprising a call to a routine; a breakpoint data structure resident in the memory and configured for storing at least context information indicating a location of the call within the code; and a debugger program resident in the memory. The debugger program is configured to interrupt execution of the code under debug in response to encountering a breakpoint and determining that the routine is called from the target call site as determined with reference to the context information.

Still other embodiments include computer-readable mediums containing instructions which, when executed, perform the above methods.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a breakpoint table, according to one embodiment of the present invention.

DETAILED DESCRIPTION OF THE PREFERRED EMBODIMENTS

Figure 1:
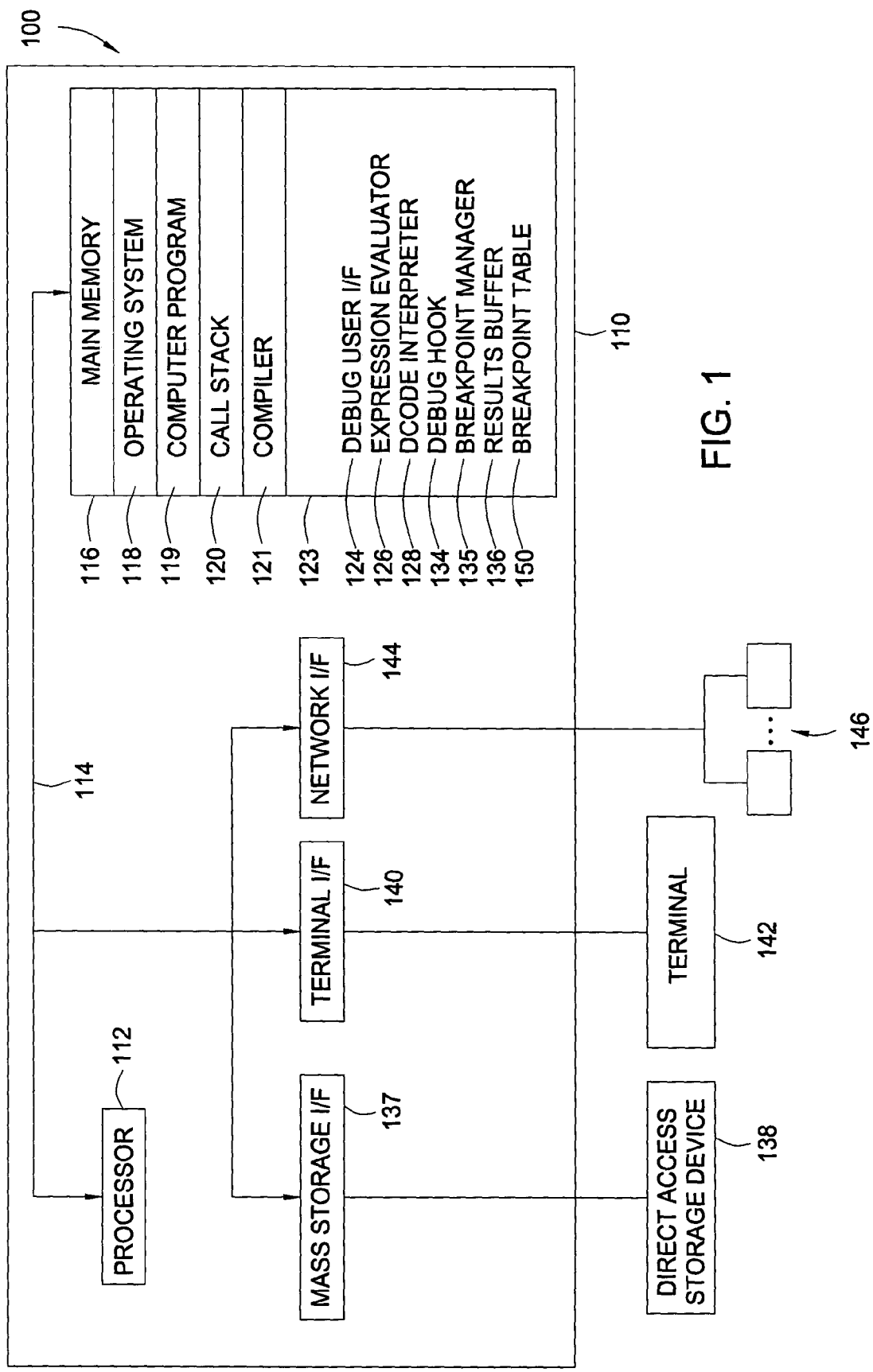
FIG. 1 is a high-level diagram of a computer, according to one embodiment of the present invention.

The present invention provides methods, apparatus and articles of manufacture for implementing a "run into" function for a selected function of some code under debug. In particular, the user selects a function with respect to a particular target call site (i.e., the location from which the function of interest is called). The function is generally selected by a user through a user-interface screen. In one embodiment, by invoking the run into function, the debugger places a temporary breakpoint(s) at the entry point(s) to the selected function. When one of these breakpoints is encountered during execution, the debugger determines whether the function was called from the specified place in the code (i.e., the target call site) and, if so, fires the breakpoint, halting execution, and removing all related temporary breakpoints. Because the breakpoint(s) only causes execution to halt if the function is called from a particular place in the code, the breakpoint may be referred to as a "context sensitive breakpoint" or "conditional breakpoint". In another embodiment, a single breakpoint is set at the exact location of the call instruction for the selected function. Upon encountering the breakpoint, the debugger halts execution and then performs a step into operation to step into the function. In the latter embodiment, the breakpoints are referred to herein as "instruction specific breakpoints". In each of the embodiments, the inventive breakpoint being set is generically referred to as a "run into breakpoint".

One embodiment of the invention is implemented as a program product for use with a computer system such as, for example, the computer 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In one aspect, the invention is particularly advantageous in the context of highly modular languages such as object-oriented programming languages including Java and C++. Accordingly, reference is made throughout the present application to well-known object-oriented programming constructs such as classes, objects and methods. Again, the use of particular terminology is merely for convenience or illustration, and not limiting of the invention. In some cases, different terms are used for the same or similar aspects of the invention. For example, in the claims appended below, the term "routine" or "function" may be used as a generic substitute for the term "method" to avoid any suggestion of that the invention is limited to particular object-oriented programming languages.

Referring now to FIG. 1, a computing environment 100 is shown. In general, the distributed environment 100 includes a computer system 110 and a plurality of networked devices 146. For simplicity, only the details of the computer system 110 are shown. However, it is understood that the computer system 110 may be representative of one or more of the networked devices 146. In general, computer system 110 and the networked devices 146 could be any type of computer, computer system or other programmable electronic device, including desktop or PC-based computers, workstations, network terminals, a client computer, a server computer, a portable computer, an embedded controller, etc.

Although shown networked into a larger system, the computer system 110 may be a standalone device. Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiment may also be practiced in distributed computing environments in which tasks are performed by remote processing devices that are linked through a communications network. In a distributed computing environment, program modules may be located in both local and remote memory storage devices. In this regard, the computer system 110 and one or more of the networked devices 146 may be thin clients which perform little or no processing. In a particular embodiment, the computer system 110 is an eServer® iSeries® 400 computer available from International Business Machines, Corporation of Armonk, N.Y.

The computer system 110 could include a number of operators and peripheral systems as shown, for example, by a mass storage interface 137 operably connected to a direct access storage device 138, by a terminal interface 140 operably connected to a terminal 142, and by a network interface 144 operably connected to the plurality of networked devices 146. The terminal 142 may be any video output device for outputting viewable information.

Computer system 110 is shown comprising at least one processor 112, which obtains instructions, or operation codes, (also known as opcodes), and data via a bus 114 from a main memory 116. The processor 112 could be any processor adapted to support the debugging methods, apparatus and article of manufacture of the invention. In particular, the computer processor 112 is selected to support the debugging features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

As shown, the main memory 116 generally includes an operating system 118, a computer program 119, a call stack 120, a compiler 121, and a debugger program (the debugger) 123. The operating system may be any suitable operating system such as the OS/400® operating system. The computer program 119 represents any code that is to be examined, edited, compiled and/or debugged. The call stack 120 is associated with the computer program 119 and utilized by the operating system 118 during the execution of the program 119. The call stack 120 is a data structure that maintains information regarding the sequence of routines that are called during the execution of the computer program. Routines, which are often referred to as methods, procedures, and functions, are typically sequences of instructions or statements in a computer program that may be invoked to perform predetermined operations on a computer.

In one embodiment, the debugger 123 is a graphical user interface system debugger for the eServer iSeries computer. The OS/400 operating system and the eServer iSeries computer are available from International Business Machines, Corporation of Armonk, N.Y. Although the software constructs, such as the computer program 119 and the debugger 123, are shown residing on the same computer, a distributed environment is also contemplated. Thus, for example, the debugger 123 may be located on a networked device 146, while the computer program 119 to be debugged is on the computer system 110.

In a specific embodiment, the debugger 123 comprises a debug user interface 124, expression evaluator 126, Dcode interpreter 128 (also referred to herein as the debug interpreter 128), debugger hook (also known as a stop handler) 134, a breakpoint manager 135, a results buffer 136 and a breakpoint table 150. Although treated herein as integral parts of the debugger 123, one or more of the foregoing components may exist separately in the computer system 110. Further, the debugger may include additional components not shown.

Figure 2:
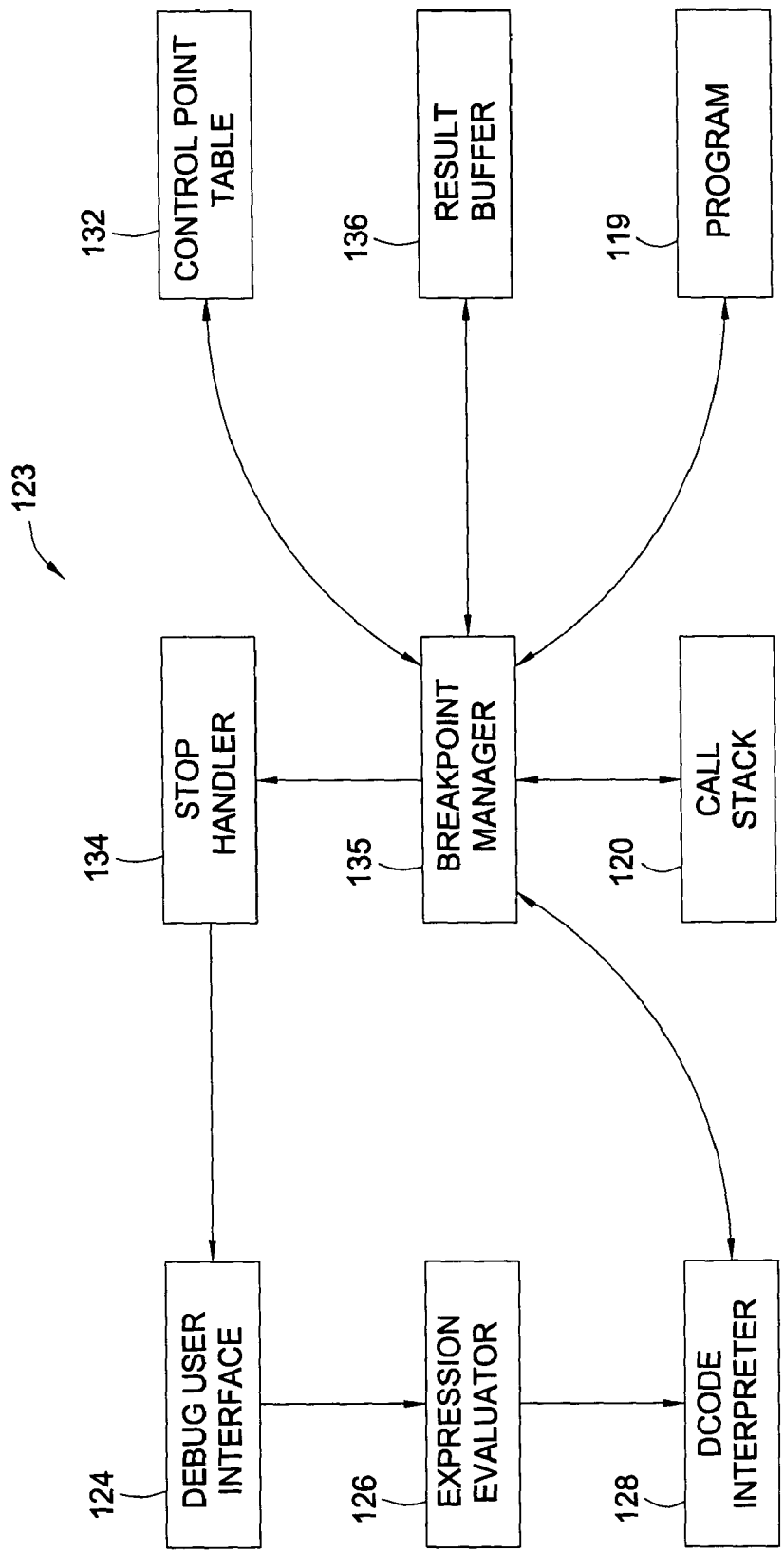
FIG. 2 is a block diagram illustrating the operation of a debugger, according to one embodiment of the present invention.

An illustrative debugging process is now described with reference to FIG. 2. A debugging process is initiated by the debug user interface 124. The user interface 124 presents the program under debugging and highlights the current line of the program on which a stop or error occurs. The user interface 124 allows the user to set control points (e.g., breakpoints and watches), display and change variable values, and activate other inventive features described herein by inputting the appropriate commands. In the embodiments of the invention, the debug user interface 124 also allows a user to select a method and implement a run into function with respect to the selected method. An Illustrative embodiment of the user interface 124 for setting a run into function is described with reference to FIG. 3.

The expression evaluator 126 parses the debugger command passed from the user interface 124 and uses a data structure (e.g., a table) generated by the compiler 121 to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. Additionally, the Dcode interpreter 128 passes a replacement op code (i.e., bad operation code) for breakpoints to the program 119 to trigger processing of the breakpoint when the replacement op code is reached during execution of program 119. As is well known in the art, a breakpoint may be detected during execution of a program by placing a known invalid instruction in the program at a desired point so that an error results when the program reaches that instruction and causes an interrupt that is then processed by the debugger. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 119. During execution, control is returned to the debugger 123 via the debug hook 134. The debug hook 134 is a code segment that returns control to the appropriate user interface. In some implementations, execution of the program eventually results in an event causing a trap to fire (e.g., a breakpoint or watchpoint is encountered). Inserting and managing special op codes that cause these traps to fire is the responsibility of the breakpoint manager 135. When a trap fires, control is then returned to the debugger by the debug hook 134 and program execution is halted. The debug hook 134 then invokes the debug user interface 124 and may pass the results to the user interface 124. Alternatively, the results may be passed to the results buffer 136 to cache data for the user interface 124.

The call stack 120 may be utilized during the execution of the program 119. A call stack is a last in-first out (LIFO) data structure. In response to a routine call from a first routine to a second routine, an operating system will generally "push" onto the top of the call stack an entry that identifies both the first routine, as well as the specific instruction or statement in that routine from which the routine call was made (or alternatively, the instruction or statement in that routine to which control should be returned upon completion of the second routine). The second routine is then executed, and if that routine calls an additional routine, an entry relating to that routine call is also added to the stack. As routines terminate in execution, entries from the call stack are then "popped" from the top of the stack and the information therein analyzed to determine the routine and instruction therein where control should be returned.

Figure 3:
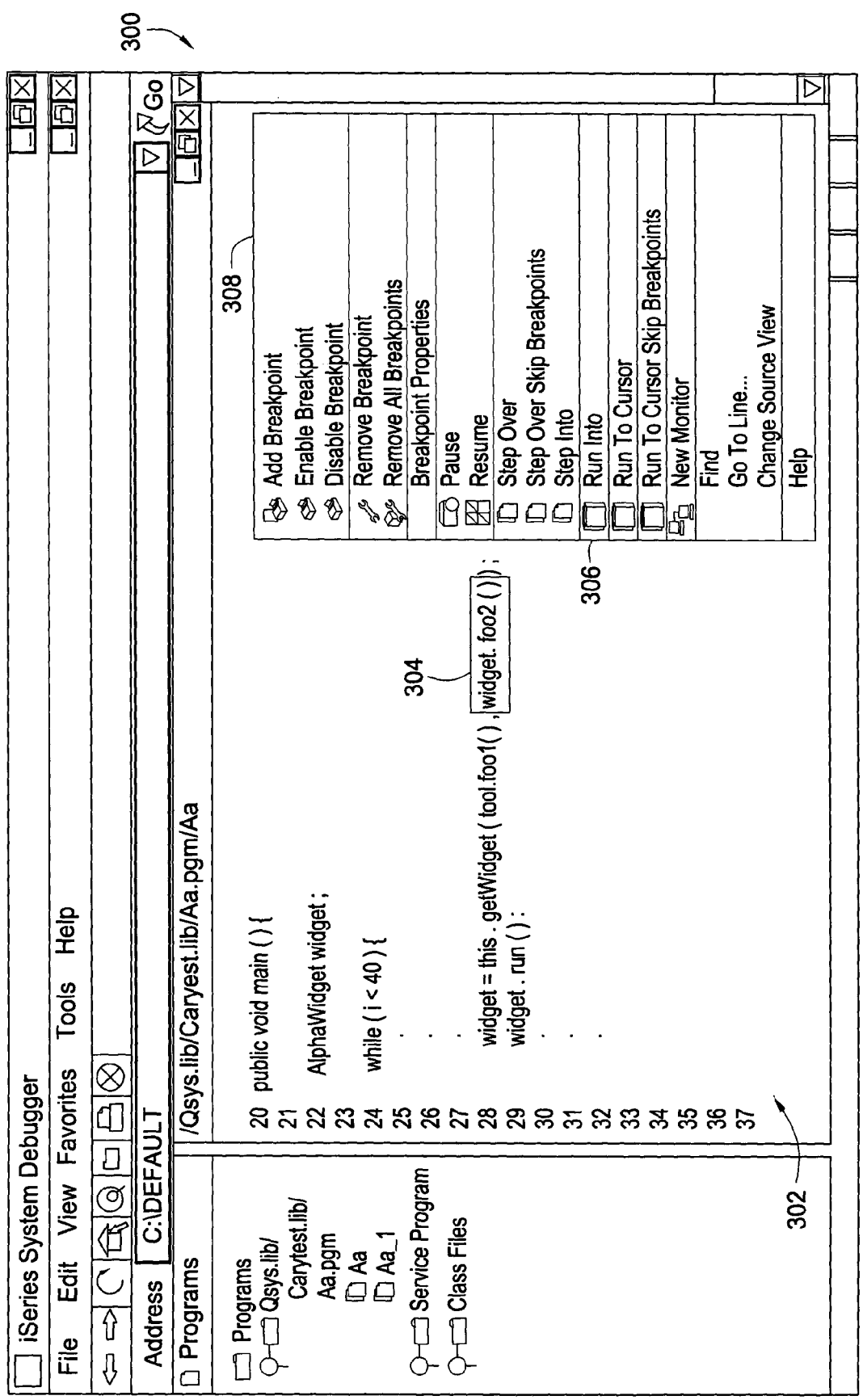
FIG. 3 is one embodiment of a user interface screen illustrating a user-implemented run into function for a selected method, according to one embodiment of the present invention.

Referring now to FIG. 3, one embodiment of the user interface 124 for setting run into functions is shown. In general, a run into function may be implemented for any method in the code. Illustratively, a user interface screen 300 of the user interface 124 is shown in which a user has selected a method 304 shown in a source code panel 302. A menu 308 is then invoked from which a "Run Into" menu item 306 is selected to implement a run into function. The menu 308 may be accessed in any variety of ways, including right-clicking a mouse after the method 304 has been selected.

In the present example the user has selected the method "foo2()" for the object "widget". This may be done, for example, highlighting the method or placing the cursor on the method (e.g., in the middle of "foo2()" or "widget.foo2()") and letting the debugger parse the method name. In any case, the intention of the user is to halt execution of the program only when the particular selected method "foo2()" is encountered. That is, execution is halted only when "foo2()" is called from the selected call site, i.e., from line 28 of the "main" routine. One embodiment of the present invention facilitates this objective by examining the context of the breakpoint and halting execution only when specified context criteria is met, as will be described in more detail below. Another embodiment facilitates this objective by executing to the call site of the method, stepping into it and then returning control to a user via a user interface.

In one embodiment, the inventive run into function is implemented by setting breakpoints whose location is recorded in the breakpoint table 150 (FIG. 1). One embodiment of the breakpoint table 150 is shown in FIG. 4. In general, the breakpoint table 150 provides some aspects which are well-known in the art in combination with some inventive features. For example, as is well-known, an op code (operation code) column 404 and an address column 406 are shown. The information contained under the address column 406 specifies a memory address of a breakpoint. The information contained under the op code column 404 specifies the original operation code of the program which has been replaced with some "bad" operation code at the corresponding address in the address column 402. A statement column 402 contains information regarding the statement at which a method is selected for setting a breakpoint.

In one embodiment, a user may elect to invoke the run into function with respect to multiple function calls. Further, a given invocation of the run into function results in multiple breakpoints being set. Accordingly, two or more run into breakpoints may be set for each invocation of the run into function (i.e., one breakpoint for each instance of a selected method). Accordingly, a technique is needed to identify a set of breakpoints related to a given invocation of the run into function (i.e., for a given selection of a function call to run into). To this end, the run into column 408 stores a run into function number used in one embodiment of the invention. For example, the first and fourth record of the table 150 contain the same run into number, 11, indicating that these two records are for the same selected method. In one embodiment, the run into number is generated by a number generation code portion. The information contained in the stack position column 410 specifies the function (i.e., routine) in which the breakpoint is set and from which the selected method is called. Upon encountering a breakpoint during execution of the computer program under debug, a test may be performed to determine whether a function stored in the stack position column 410 is the function in which the encountered breakpoint is set.

Figure 5A:
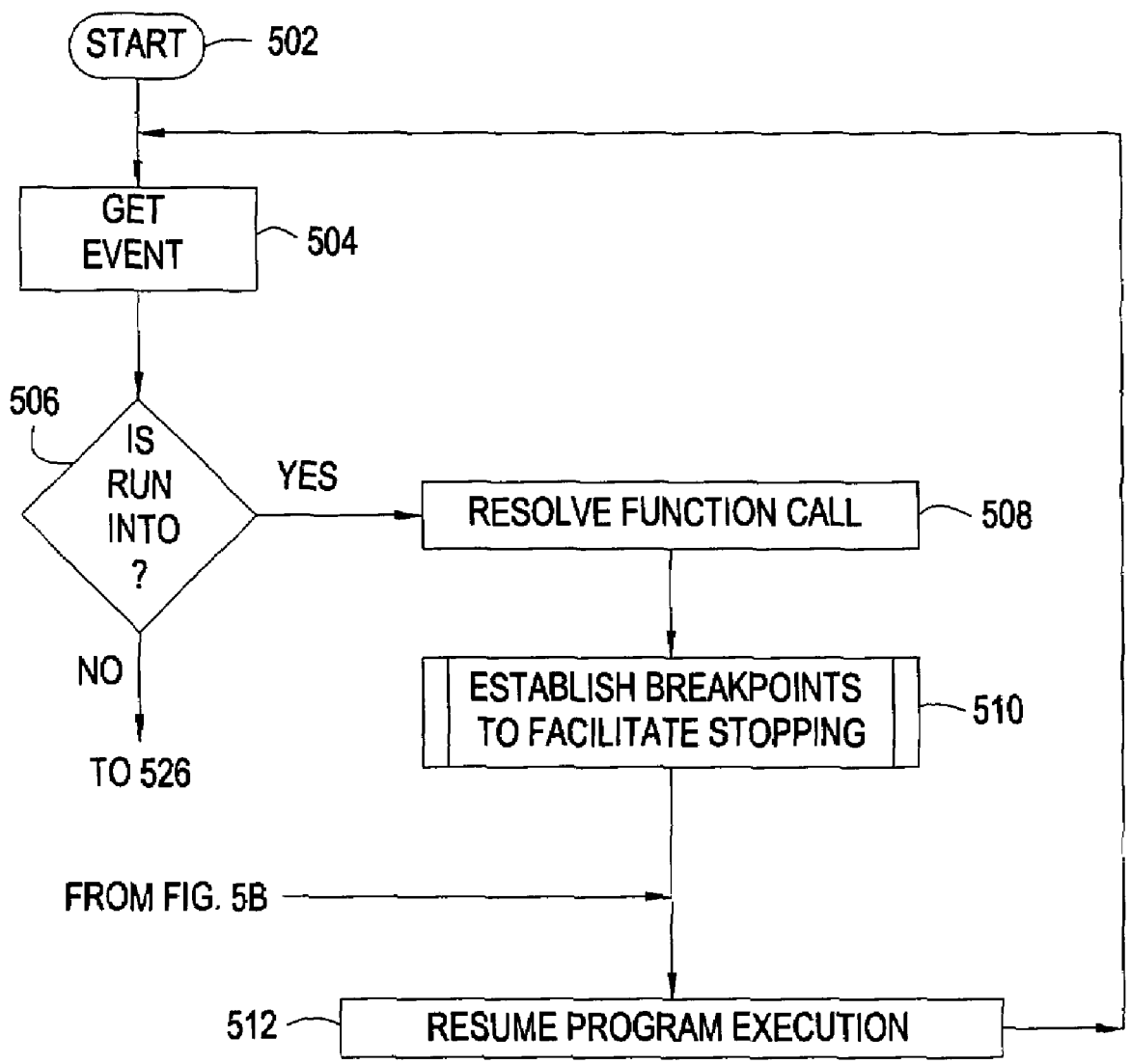
FIGS. 5A-B show a flow chart illustrating the operation of a debugger program during a run into operation, according to one embodiment of the present invention.
Figure 5B:
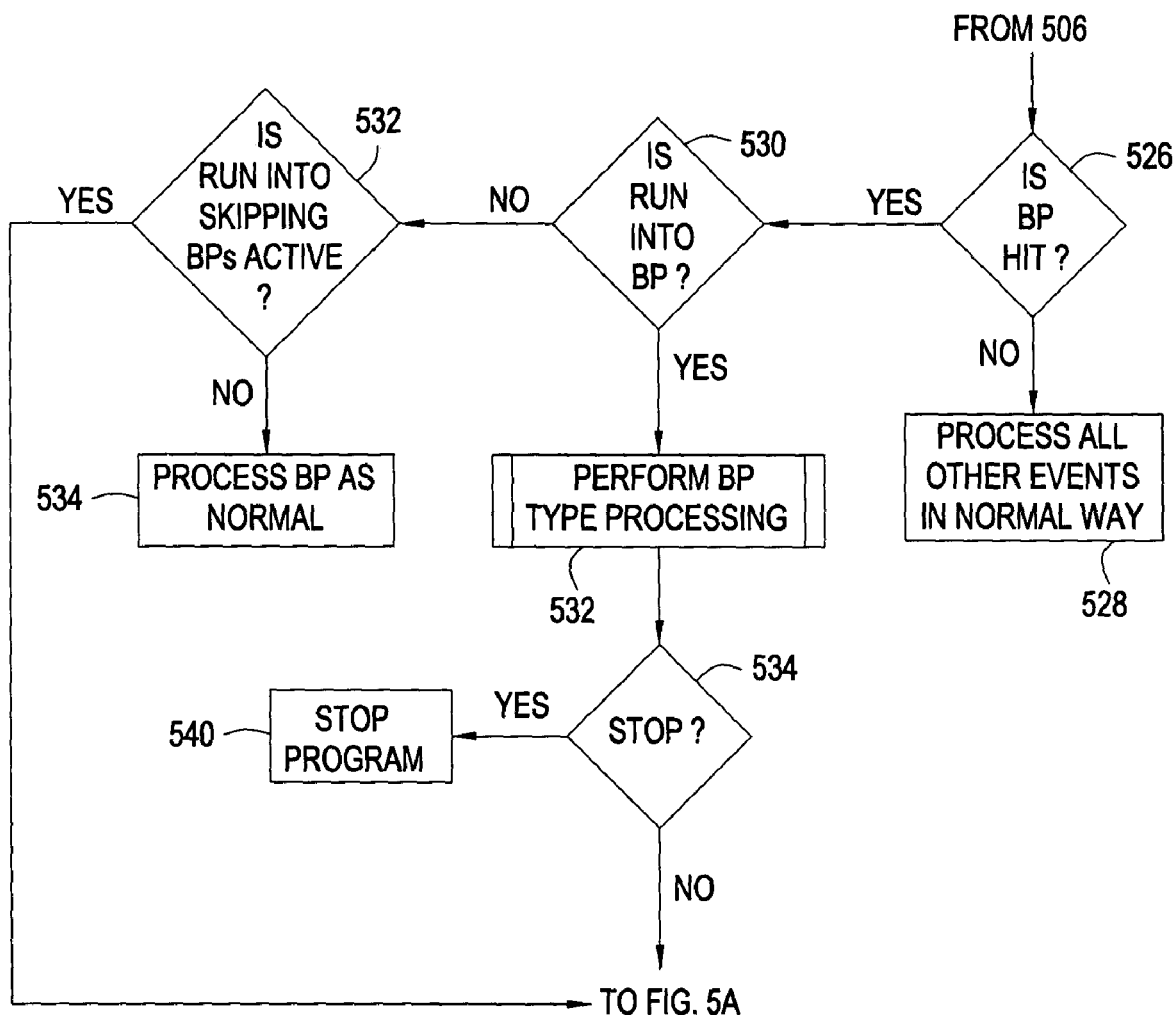

Referring now to FIG. 5, a method 500 of operating the debugger 123 in a manner consistent with embodiments of the present invention is shown. Referring first to FIG. 5A, an illustrative operation for setting run into breakpoints is shown. Upon receiving an event for processing (step 504) the debugger 123 determines whether the event is a run into function request (step 506). That is, a determination is made as to whether the user is setting a run into breakpoint for a selected method. If so, the debugger 123 resolves (i.e., parses) the function call (step 508) to facilitate classification. Then, the necessary run into breakpoints are set (step 510). The debugger 123 then resumes executing the program (step 512) until the next event (step 504). Embodiments for setting run into breakpoints (at step 510) are described with respect to FIG. 6 and FIG. 7.

Figure 6:
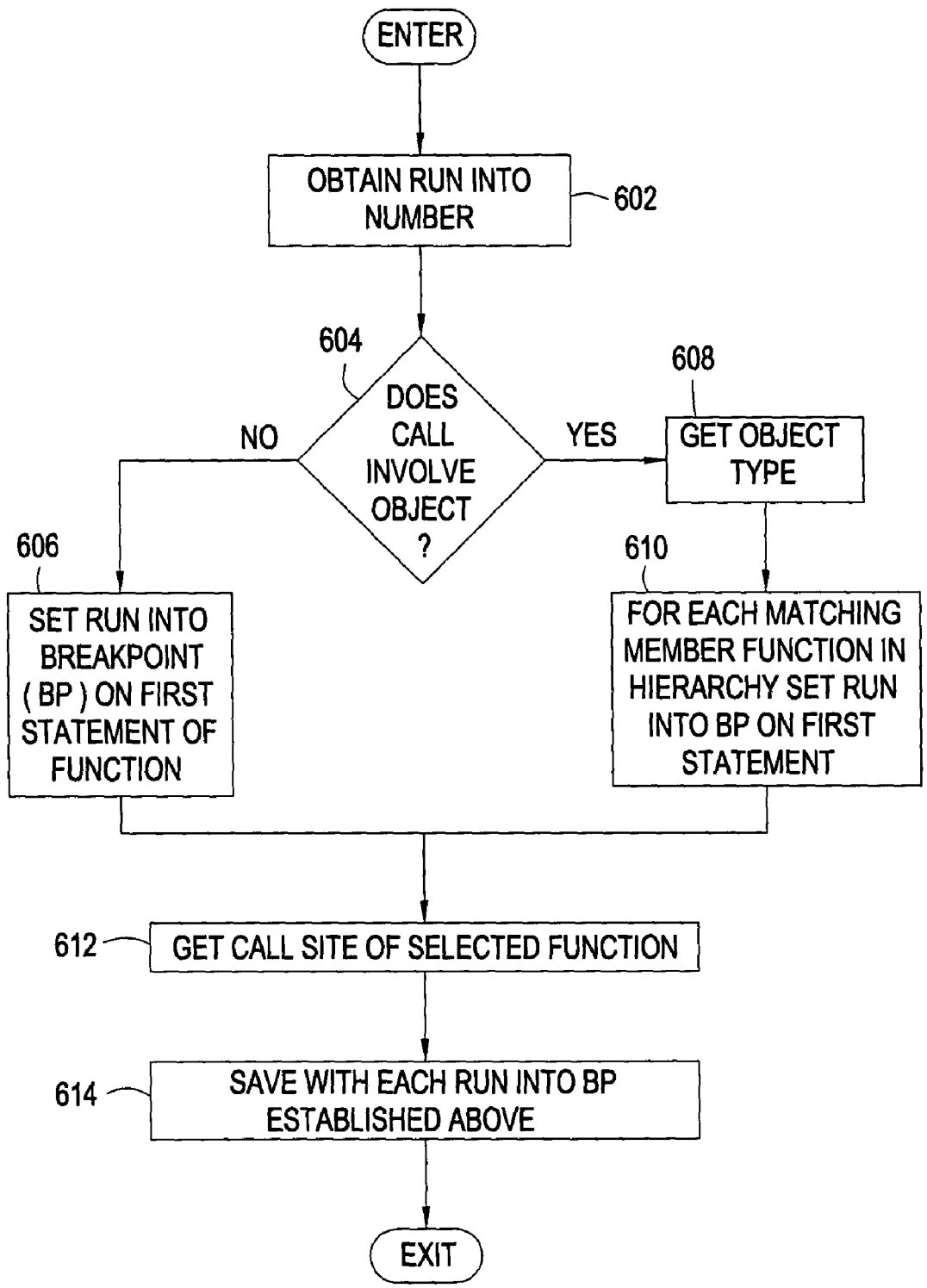
FIG. 6 shows a flow chart illustrating one embodiment of setting context sensitive breakpoints.

Referring first to FIG. 6, a method for setting context sensitive breakpoints is shown. That is, a user specifies a method call at which to halt execution, on the condition that the method call is made from a selected target site. To this end, the debugger obtains a run into number for subsequently storing it in the breakpoint table in later steps (step 602).

Having resolved the function call at step 508 (FIG. 5A), the debugger can then determine whether the selected call involves an object (step 604). In one embodiment, this step generally distinguishes non-object oriented languages from object oriented languages; although even an object oriented language may include a method that does not involve an object. If the selected call does not involve an object, the debugger may simply set breakpoints on each entry point to the method (step 606); that is, the fields of the first three columns of the breakpoint table 150 are populated. Otherwise, the debugger obtains the object type of the object involved with the selected function (at step 608) to identify cases where the function may have been overridden. Persons skilled in the art will appreciate that a fundamental feature of object-oriented programming is that classes can be related to one another by inheritance. The properties, behaviors, data and operations of a parent, or "base", class may be inherited without modification by some child, or "derived", class, or the behavior, properties and operations may be selectively refined under the control of the programmer in the derived class. The latter function is generally referred to as overriding. The function name remains the same, but the changed or overridden function operates on a different type. When defining a derived class, one may start by building on an existing base class which is similar to the one to be created. The derived class inherits the implementation and behavior of the base class, including its functions, except as modified by overriding amendments detailed in the derived class definition. For example, there may be an object type 2 which is derived from and inherited properties of an object type 1. Some functions in object type 1 may be overridden (modified). Illustratively, if object type 1 has a size method that was overridden in object type 2, there now exist two size methods that relate to an object type 1. To ensure breakpoints are set for both methods, the debugger obtains the object type for a function and then traverses the class hierarchy searching for those objects that are based from this object type and override this same function. Accordingly it may be necessary to get the object type (step 608) and then insert breakpoints for each matching function within the class hierarchy of the object (step 610). Techniques for resolving object type are well known in the art and are not further described here.

After the run into breakpoints are set, the call site of the selected method is identified (step 612). The call site refers to the location or context of the selected method; i.e., where the method is being called from. The information identifying the call site is referred to herein as "calling context information". It is contemplated that the level of granularity of the "calling context information" is selectable according to the particular implementation, but preferably the "calling context information" uniquely (i.e., unambiguously) identifies the call site. Unambiguous identification of the call site may be necessary, for example, where two or more objects are objects of the same class. Consider the following code: foo(obj1.bar(), obj2.bar()), where obj1 and obj2 are of the same class. Now assume the user desires to run into obj2.bar(). Without unique identification of the call site, execution may halt at obj1.bar().

The particular technique for unambiguously identifying the call site may vary depending on the particular implementation. In one embodiment, the line number of the call site is known and is mapped to information (i.e., the "calling context information") that will appear on the call stack 120, e.g., a statement number or address. This information is then stored in the breakpoint table 150 in the appropriate record(s) set for each breakpoint at steps 606 or 610 (step 614). The debugger 123 then resumes executing the program (step 512) until the next event (step 504), as shown in FIG. 5A.

Figure 7:
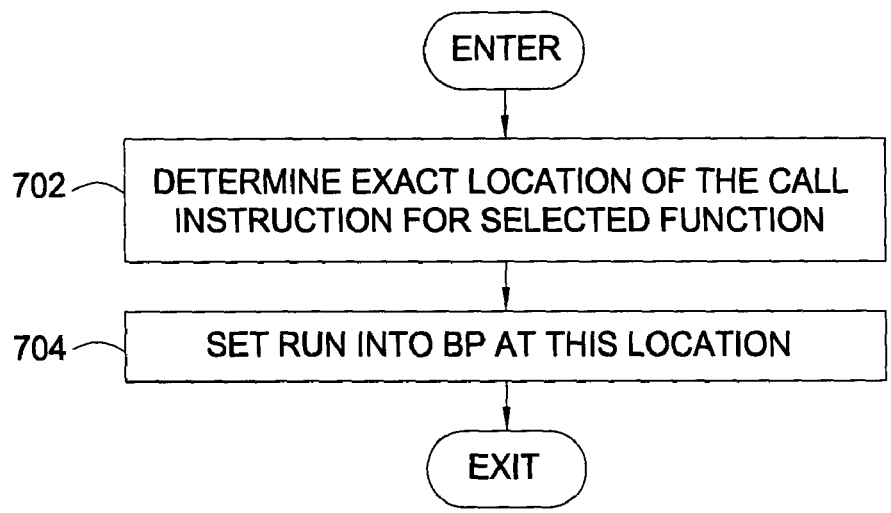
FIG. 7 shows a flow chart illustrating one embodiment of setting instruction specific breakpoints.

Referring now to FIG. 7, a method for setting instruction specific breakpoints is shown. In particular, the exact location of the call instruction for the selected function is determined (step 702). This may the same processing as is performed at step 612 described above with reference to FIG. 6. A run into breakpoint is then set at the determined instruction location (step 704).

Returning to step 506 of FIG. 5A, if the debug event is not a run into request, the debugger 123 determines (at step 526) whether the event is an encountered breakpoint. If step 526 is answered negatively, the event is handled in an appropriate way (step 528). If, however, the event is a breakpoint hit, then the debugger determines whether the breakpoint is a run into breakpoint (530).

If the breakpoint is not a run into breakpoint, then the debugger determines whether a run into skipping operation is active (step 532). In one embodiment, the run into skipping operation may be utilized to provide added flexibility for processing non-run-into breakpoints prior to completing a run into operation. When the skipping operation is active, non-run-into breakpoints may be ignored and program execution may be resumed. If the process is not active, then all other breakpoints are processed as normal (step 534). Of course, other features and functionality may be added to the debugger 123. For example, other conditions may be placed on a run into breakpoint. Illustrative conditions include a value on a certain parameter or some instance variable. Persons skilled in the art will recognize other embodiments.

Referring back to step 530, when the breakpoint is a run into breakpoint, the debugger takes appropriate action depending on whether the breakpoint is a context sensitive breakpoint or an instruction specific breakpoint (step 532). In particular, a determination is made whether the breakpoint encountered results halting execution (step 534). Embodiments of step 532 are described in FIGS. 8 and 9.

Figure 8:
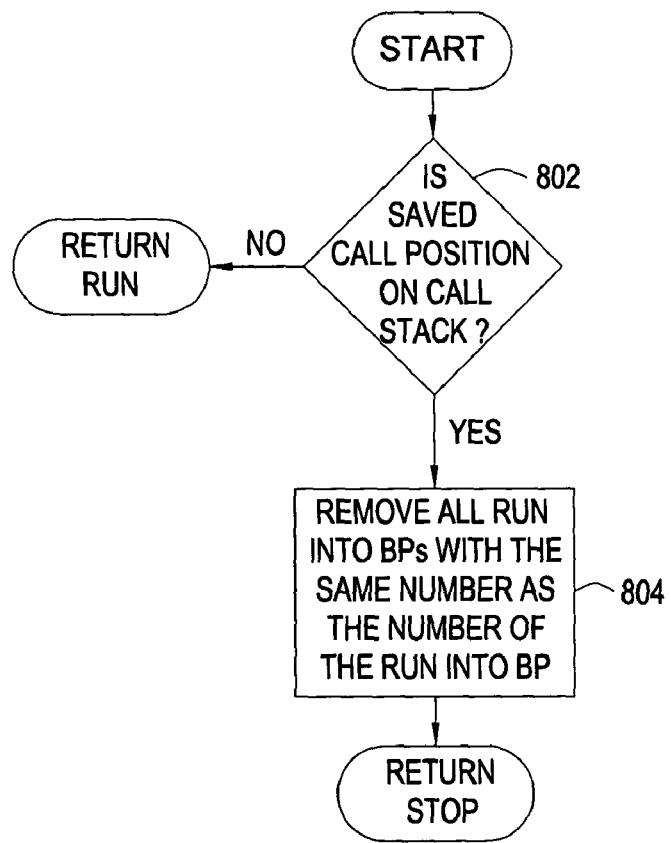
FIG. 8 shows a flow chart illustrating one embodiment of handling context sensitive breakpoints.

Referring first to FIG. 8, a flow chart is shown illustrating an operation performed when the breakpoint encountered is a context sensitive run into breakpoint. The debugger compares the call stack with the saved information in the stack position column of the breakpoint table 150 to determine whether the breakpoint was called from the desired function (step 802). If the contents do not match, the function is not called from the desired location and, therefore, program execution is resumed with no other action (i.e., processing proceeds to step 512 of FIG. 5A). If the statement number and the function name match with the contents of the call stack, however, then all run into breakpoints associated with the same run into number are removed (step 804) and program execution is halted (steps 534 and 540 of FIG. 5B).

Figure 9:
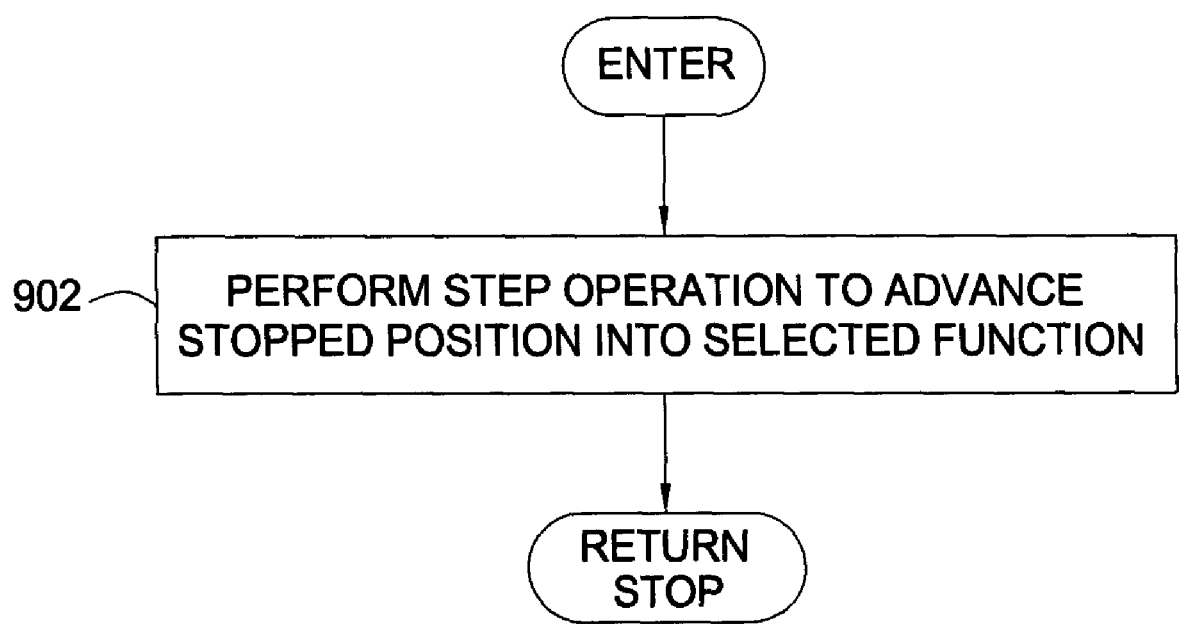
FIG. 9 shows a flow chart illustrating one embodiment of handling instruction specific breakpoints.

Referring now to FIG. 9, a flow chart is shown illustrating an operation performed when the breakpoint encountered is an instruction specific run into breakpoint. If so, execution is currently at the instruction call to the selected function. Accordingly, the debugger performs a conventional step into operation to advance the debugger's stopped position into the function of interest (step 902). The debugger then halts (steps 534 and 540 of FIG. 5B).

While the foregoing is directed to embodiments of the present invention, other and further embodiments of the invention may be devised without departing from the basic scope thereof, and the scope thereof is determined by the claims that follow.

What is claimed is:

1. A computer-implemented method for debugging code, comprising:
   while execution is halted at a first point in the code, receiving a user selection of a target call site of the code, the user selection being made through a graphical user interface, and the target call site comprising a call to any one of a plurality of overriding methods;
   wherein the code is object-oriented;
   in response to the user selection, setting a run-into breakpoint at each respective entry point of the plurality of overriding methods, wherein the run-into breakpoint is configured to halt subsequent execution only when the target call site calls one of the plurality of overriding methods;
   while the code is under debug:
      encountering one of the plurality of run-into breakpoints, during execution of the code under debug; and
      determining whether the target call site called the one of the plurality of overriding methods;
      if the target call site called the one of the plurality of overriding methods:
      halting execution of the code.

2. A computer-implemented method for debugging code, comprising:
   (a) while execution is halted at a first point in the code, receiving a user selection of a target call site of the code, the user selection being made through a graphical user interface, and the target call site comprising a call to any one of a plurality of overriding methods
   (b) in response to receiving the user selection, setting a run-into breakpoint at each respective entry point of the plurality of overriding methods;
   (c) determining call context information identifying a location of the target call site in the code;
   (d) encountering the run-into breakpoint; and
   (e) for each of the run-into breakpoints encountered during execution of the code:
   determining whether the target call site called one of the plurality of overriding methods, based on the call context information; and
   if so:
   halting execution of the code.

3. The method of claim 2, further comprising:
   repeating each of the steps (a)-(e) for a plurality of target call sites, wherein each target call site has an associated method of an associated plurality of overriding methods, an associated breakpoint at each respective associated entry point of the associated plurality of overriding methods, and associated call context information; and
   automatically removing at least one of the associated breakpoints upon determining that one of the plurality of target call sites has called the associated method based on the associated call context information.

4. The method of claim 2, wherein determining whether the target call site called the one of the plurality of overriding methods comprises comparing the call context information to selected content of a call stack.

5. The method of claim 4, wherein the target call site is determined to have called the one of the plurality of overriding methods if stored call context information matches the selected content of the call stack.

6. The method of claim 4, wherein the selected content of the call stack is a call to the one of the plurality of overriding methods, and wherein the target call site is determined to have called the one of the plurality of methods if the stored call context information matches the selected content of the call stack.

7. The method of claim 2, wherein the code is object-oriented, and the method further comprises identifying the plurality of overriding methods.

8. The method of claim 7, further comprising, prior to identifying the plurality of overriding methods, determining that the method is associated with an object.

9. The method of claim 7, wherein identifying the plurality of overriding methods comprises traversing a class hierarchy, and locating each matching member method according to the selected target call site.

10. A computer readable storage medium containing a program which, when executed, performs an operation for debugging code, comprising:
   (a) while execution is halted at a first point in the code, receiving a user selection of a target call site of the code, the user selection being made through a graphical user interface, and the target call site comprising a call to any one of a plurality of overriding methods;
   (b) in response to receiving the user selection, setting a run-into breakpoint at each respective entry point of the plurality of overriding methods;
   (c) determining call context information identifying a location of the target call site in the code;
   (d) encountering the run-into breakpoint; and
   (e) for each of the run-into breakpoints encountered during execution of the code:
      determining whether the target call site called one of the plurality of overriding methods, based on the call context information; and
      if so:
         halting execution of the code at.

11. The computer readable storage medium of claim 10, further comprising:
   repeating each of the steps (a)-(e) for a plurality of target call sites, wherein each target call site has an associated method of an associated plurality of overriding methods, an associated breakpoint at each respective associated entry point of the associated plurality of methods, and associated call context information; and
   automatically removing at least one of the associated breakpoints upon determining that one of the plurality of target call sites has called the associated method based on the associated call context information.

12. The computer readable storage medium of claim 10, wherein determining whether the target call site called the one of the plurality of overriding methods comprises comparing the call context information to selected content of a call stack.

13. The computer readable storage medium of claim 12, wherein the target call site is determined to have called the one of the plurality of overriding methods if stored call context information matches the selected content of the call stack.

14. The computer readable storage medium of claim 12, wherein the selected content of the call stack is a call to the one of the plurality of overriding methods, and wherein the target call site is determined to have called the one of the plurality of overriding methods if the stored call context information matches the selected content of the call stack.

15. The computer readable storage medium of claim 10, wherein the code is object-oriented, and the method further comprises identifying the plurality of overriding methods.

16. The computer readable storage medium of claim 15, further comprising, prior to identifying the plurality of overriding methods, determining that the method is associated with an object.

17. The computer readable storage medium of claim 15, wherein identifying the plurality of overriding methods comprises traversing a class hierarchy, and locating each matching member method according to the selected target call site.

18. A computer, comprising:
   a memory;
   a processor;
   code under debug resident in the memory, the code comprising at least one target call site comprising a call to any one of a plurality of overriding methods, the target call site being selected by the user through a graphical user interface while execution is halted at a first point in the code;
   a breakpoint data structure resident in the memory and configured for storing at least context information indicating a location of the target call site within the code; and
   a debugger program resident in the memory and which, when executed by the processor, is configured to place a run-into breakpoint at each respective entry point of the plurality of overriding methods in response to the target call site being selected by the user, and is further configured to interrupt execution of the code under debug in response to encountering a breakpoint set on one of the plurality of overriding methods if the selected target call site called the one of the plurality of overriding methods with reference to the context information.

19. The system of claim 18, further comprising a caller data structure resident in the memory and configured for storing at least callers of overriding methods in the code as encountered during an execution path; and wherein the debugger program is configured to determine whether the routine is called from the target call site by comparing the context information to a caller stored in the caller data structure.

20. The system of claim 18, wherein the code under debug is object-oriented.

21. The method of claim 2, where the call context information unambiguously identifies the location of the target call site in the code.

* * * * *